United States Patent
Shirakata

(10) Patent No.: US 9,277,098 B2
(45) Date of Patent: Mar. 1, 2016

(54) IMAGE FORMING SYSTEM HAVING SIMULATION UNIT

(75) Inventor: Jiro Shirakata, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 954 days.

(21) Appl. No.: 13/305,195

(22) Filed: Nov. 28, 2011

(65) Prior Publication Data

US 2012/0150470 A1  Jun. 14, 2012

(30) Foreign Application Priority Data

Dec. 13, 2010 (JP) ................................. 2010-277428

(51) Int. Cl.
| | |
|---|---|
| G01D 18/00 | (2006.01) |
| G06F 3/01 | (2006.01) |
| G06F 3/02 | (2006.01) |
| G06F 3/03 | (2006.01) |
| H04N 1/50 | (2006.01) |
| G03G 15/00 | (2006.01) |
| H04N 1/60 | (2006.01) |

(52) U.S. Cl.
CPC ........... *H04N 1/506* (2013.01); *G03G 15/5079* (2013.01); *H04N 1/6091* (2013.01); *G03G 15/55* (2013.01)

(58) Field of Classification Search
CPC ...................... H04N 2201/00; H04N 2201/325
USPC ............... 702/44, 56, 85, 104, 171, 179, 182, 702/183; 250/311; 358/1.9, 504; 700/29
See application file for complete search history.

(56) References Cited

U.S. PATENT DOCUMENTS

| | | | | |
|---|---|---|---|---|
| 5,444,525 A | * | 8/1995 | Takahashi | ............ G03G 15/326 101/211 |
| 7,941,232 B2 | * | 5/2011 | Ishii et al. | ........................ 700/29 |
| 8,625,176 B2 | * | 1/2014 | Miyake | .......................... 358/504 |
| 8,755,837 B2 | * | 6/2014 | Rhoads | ............. G06F 17/30244 382/162 |
| 9,075,779 B2 | * | 7/2015 | King | ....................... G06K 9/228 |
| 2005/0045821 A1 | * | 3/2005 | Noji et al. | ..................... 250/311 |
| 2012/0154834 A1 | * | 6/2012 | Miyake | ........................... 358/1.9 |

FOREIGN PATENT DOCUMENTS

| | | |
|---|---|---|
| JP | 2003-34055 | 2/2003 |
| JP | 2004074696 A | 3/2004 |
| JP | 2007-172127 | 7/2007 |

OTHER PUBLICATIONS

Japanese Office Action dated Aug. 11, 2014 issued during prosecution of related Japanese application No. 2010-277428.

* cited by examiner

*Primary Examiner* — John Breene
*Assistant Examiner* — Felix Suarez
(74) *Attorney, Agent, or Firm* — Fitzpatrick, Cella, Harper & Scinto

(57) ABSTRACT

An image forming system includes an image forming apparatus and a server. The image forming apparatus i) forms an image, ii) measures position information of the formed image, iii) detects environment information, iv) determines first correction data based on the measured position information, v) determines second correction data from the detected environment information by using a transfer function, vi) corrects a position of an image to be formed based on the first correction data and the second correction data, and vii) transmits the position information and the environment information to the server. The server viii) receives the position information and the environment information from the image forming apparatus, ix) predicts, based on the environment information, predicted position information to be measured using the transfer function, and x) controls whether or not the transfer function of the second determination unit is updated based on the predicted position information and the received position information.

5 Claims, 18 Drawing Sheets

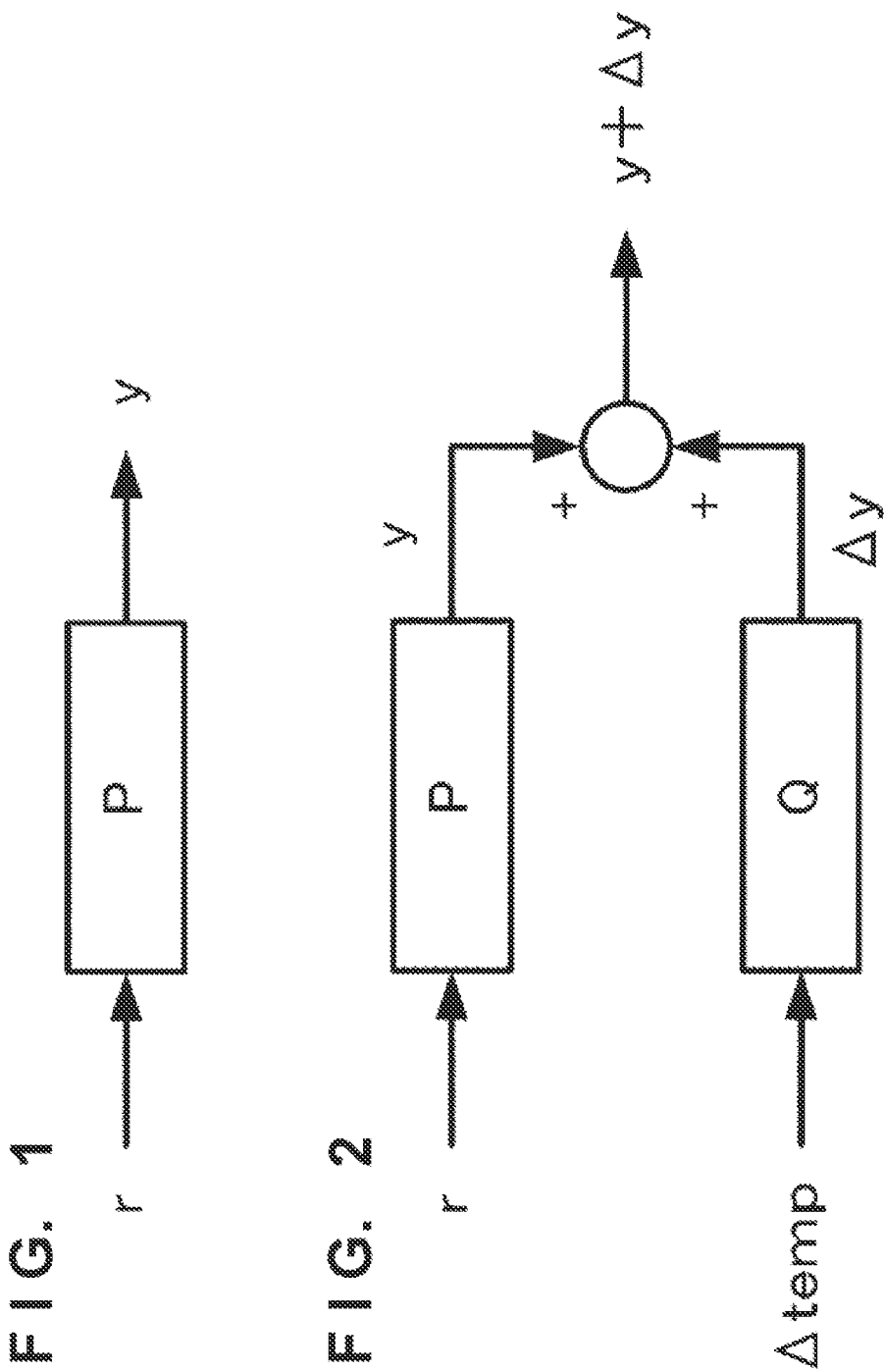

IMAGE FORMING SYSTEM HAVING SIMULATION UNIT

BACKGROUND OF THE INVENTION

1. Field of the Invention

The present invention relates to an image forming system including an image forming apparatus, such as a copier, a printer, or a printing press, and a server for reducing a deviation from a control objective to be attained at the image forming apparatus.

2. Description of the Related Art

Japanese Patent Laid-Open No. 2004-74696 has proposed a system in which calibrations of an image forming apparatus connected to a network are remotely carried out.

In the system described in Japanese Patent Laid-Open No. 2004-74696, however, a deviation from a control objective results from an environmental change after a calibration and from deterioration with time of the apparatus until the next calibration is carried out. Because of this, a system can be considered in which a change in behavior of an image forming apparatus after a calibration is simulated to correct a deviation from a control objective having occurred between the calibration and the next calibration. But there is a problem that differences often arise between actual behavior of image forming apparatuses and simulation results.

SUMMARY OF THE INVENTION

The present invention provides an image forming system in which a deviation from a control objective that occurs between calibrations can be reduced when compared with conventional image forming systems.

According to a first aspect of the present invention, an image forming system includes an image forming apparatus and a server. The image forming apparatus includes a calibration unit configured to calibrate first correction data based on measured data; a simulation unit configured to calculate second correction data from an input value by using a transfer function; an image forming unit configured to form an image based on the first and second correction data; and a transmitting unit configured to transmit the measured data to the server. The server includes a receiving unit configured to receive the measured data from the image forming apparatus; a updating unit configured to update the transfer function based on the measured data; a setting unit configured to set the updated transfer function to the simulation unit of the image forming apparatus.

Further features of the present invention will become apparent from the following description of exemplary embodiments with reference to the attached drawings.

BRIEF DESCRIPTION OF THE DRAWINGS

FIG. 1 is a control block diagram of image position control at an image forming apparatus;

FIG. 2 is a control block diagram of image position control performed when a temperature change has occurred;

DESCRIPTION OF THE EMBODIMENTS

Several embodiments of the present invention will be described in detail below with reference to the drawings.

First Embodiment

A first embodiment will now be described with reference to a calibration of image position control. To begin with, an automatic registration correction to image position control will be described below. In FIG. 1, reference letter r denotes image writing timing, reference letter y denotes image position, and reference letter P denotes a transfer function representing a relationship between image writing timing r and an image position y. As shown in FIG. 1, after image writing timing r has been provided to the image forming unit of an image forming apparatus as an input, an image printed at the image position y by image formation operation is output.

In a real-world image forming apparatus, a temperature change occurs after a calibration. In FIG. 2, reference letter r denotes image writing timing, reference letter y denotes image position, symbol Δtemp denotes a temperature change amount, symbol Δy denotes an image mispositioning amount due to temperature change, reference letter P denotes a transfer function representing a relationship between image writing timing r and image position y, and reference letter Q denotes a transfer function representing a relationship between temperature change Δtemp and image mispositioning amount Δy. For example, reference letter Q denotes a transfer function for use in a conversion from a temperature change amount Δtemp to an image mispositioning amount Δy. In addition, transfer functions P and Q represent operation of a real-world image forming unit. Therefore an image, in which the image mispositioning amount Δy is involved by the after-calibration temperature change amount Δtemp, is output as shown in FIG. 2. This is because thermal expansion develops at members concerned with the position of the image, such as a photoconductor drum and an exposure unit that constitute an image forming unit, and at a casing supporting those members due to the temperature change, and therefore the exposure position of the image shifts, for example.

Figure 3:
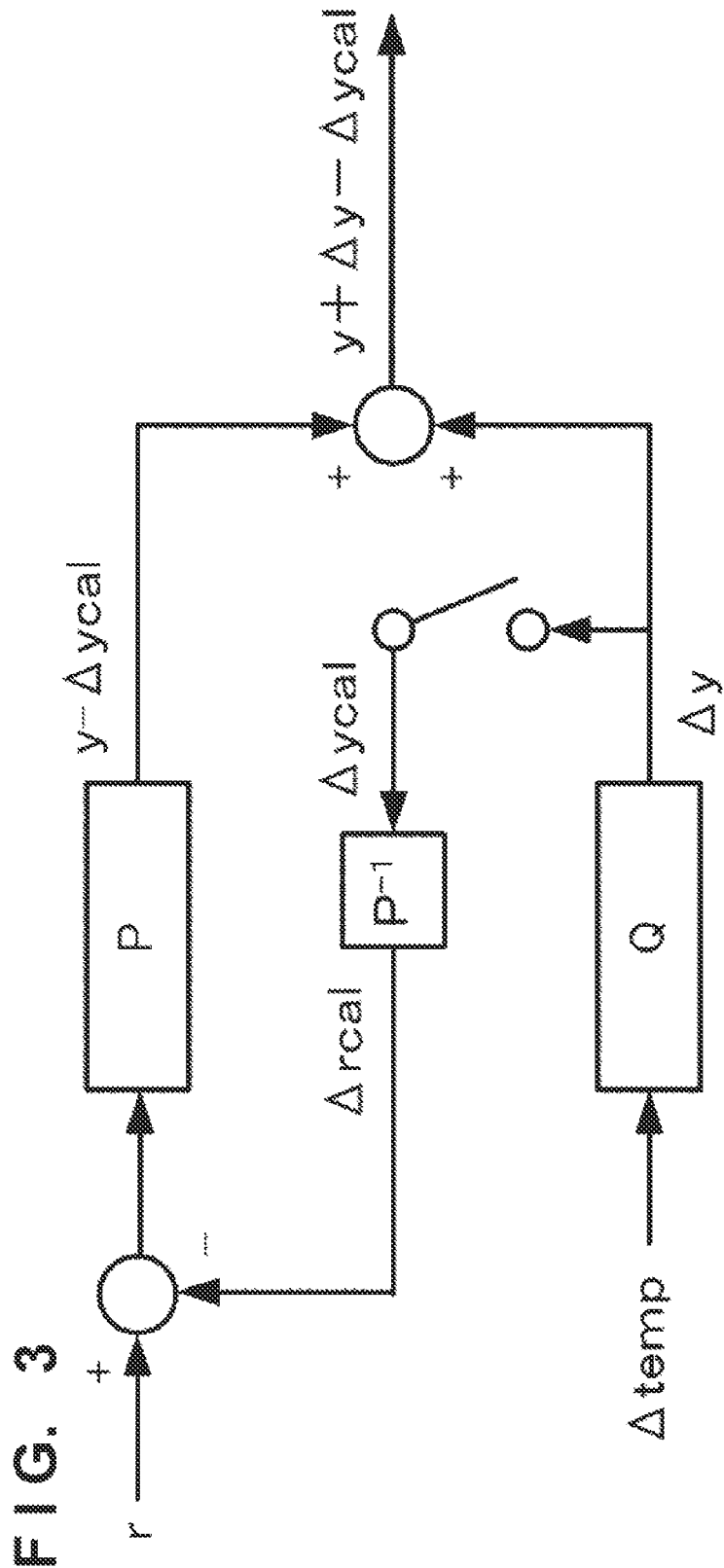
FIG. 3 is a control block diagram of image position control using an automatic registration correction.

The automatic registration correction is made to reduce an image mispositioning amount Δy. In FIG. 3, reference letter r denotes image writing timing, reference letter y denotes image position, symbol Δtemp denotes a temperature change amount, symbol Δy denotes an image mispositioning amount due to temperature change, symbol Δycal denotes an image mispositioning amount at the time of a calibration operation, symbol Δrcal denotes an image writing timing correction value calculated in the calibration operation, reference letter P denotes a transfer function representing a relationship between image writing timing r and image position y, and reference letter Q denotes a transfer function representing a relationship between temperature change Δtemp and image mispositioning amount Δy. Specifically, first a patch sensor senses the image mispositioning amount Δycal relative to an objective, and then a control unit calculates the image writing timing correction value Δrcal from the image mispositioning amount Δycal. In an image formation operation after that, as shown in FIG. 3, the result of subtracting the correction value Δrcal from the image writing timing r is used as an input to the image forming unit.

Figure 4:
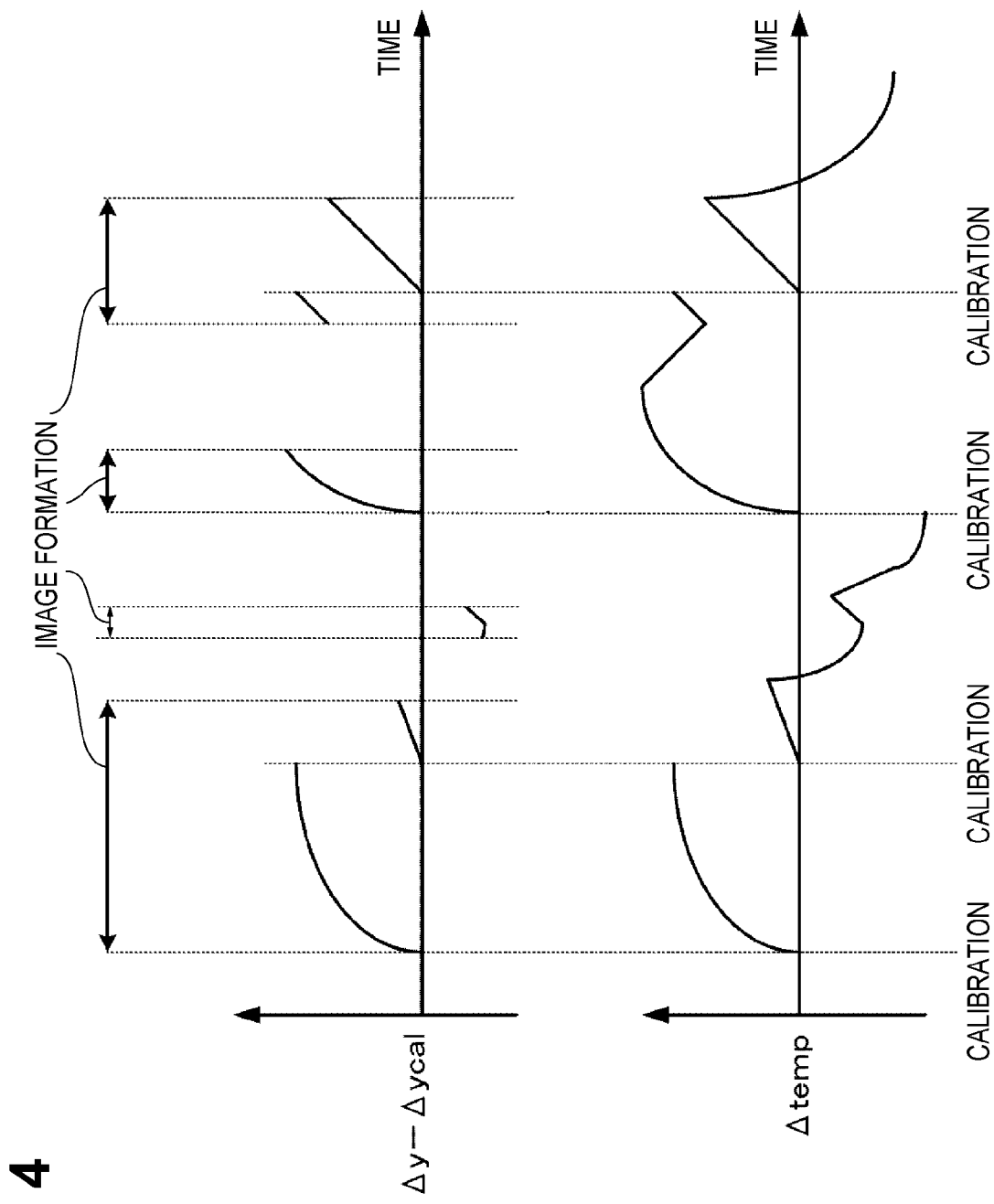
FIG. 4 is a graph showing changes of image mispositioning in the case where the automatic registration correction has been used.

In a case where the image formation must be suspended for calibrations, however, it may be impossible to frequently carry out the calibrations. Therefore, as shown in FIG. 4, a difference arises between image mispositioning amounts Δy and Δycal due to a temperature change after a calibration, and therefore the image mispositioning remains. Specifically, FIG. 4 shows that although an image mispositioning amount becomes zero after each calibration, image mispositioning results from a temperature change after each calibration.

Figure 5:
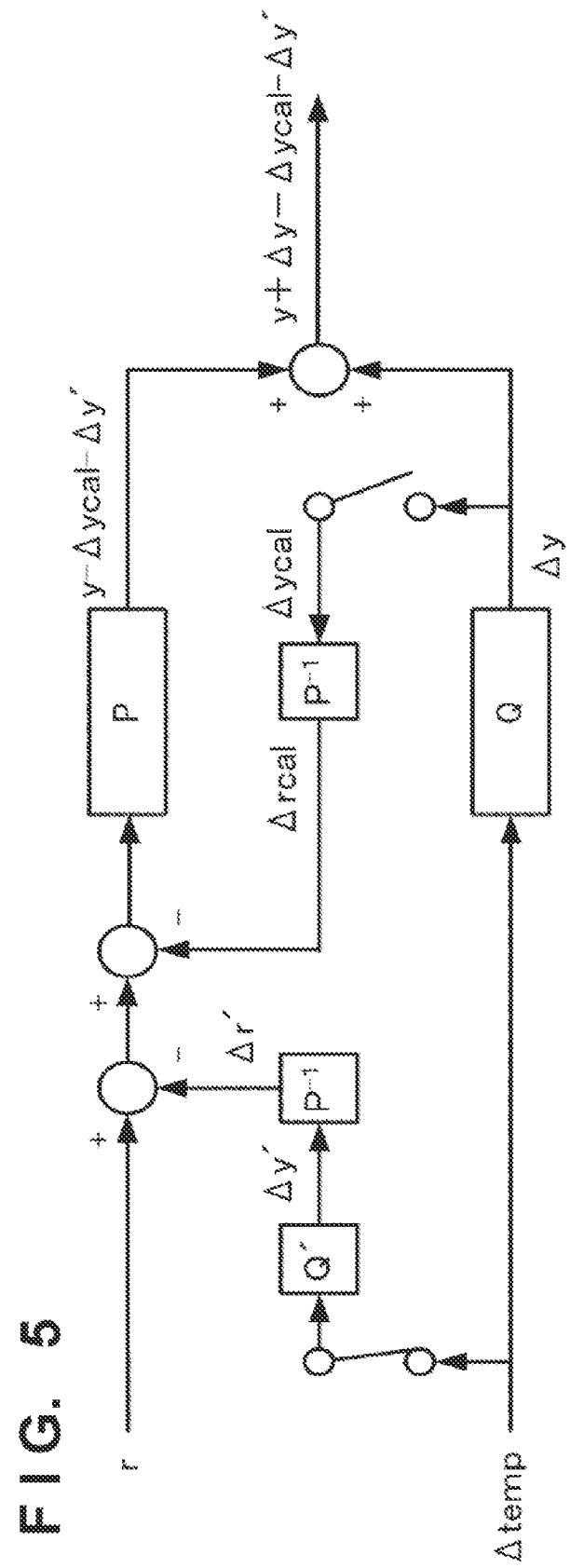
FIG. 5 is a control block diagram of image position control at an image forming apparatus according to a first embodiment.
Figure 6:
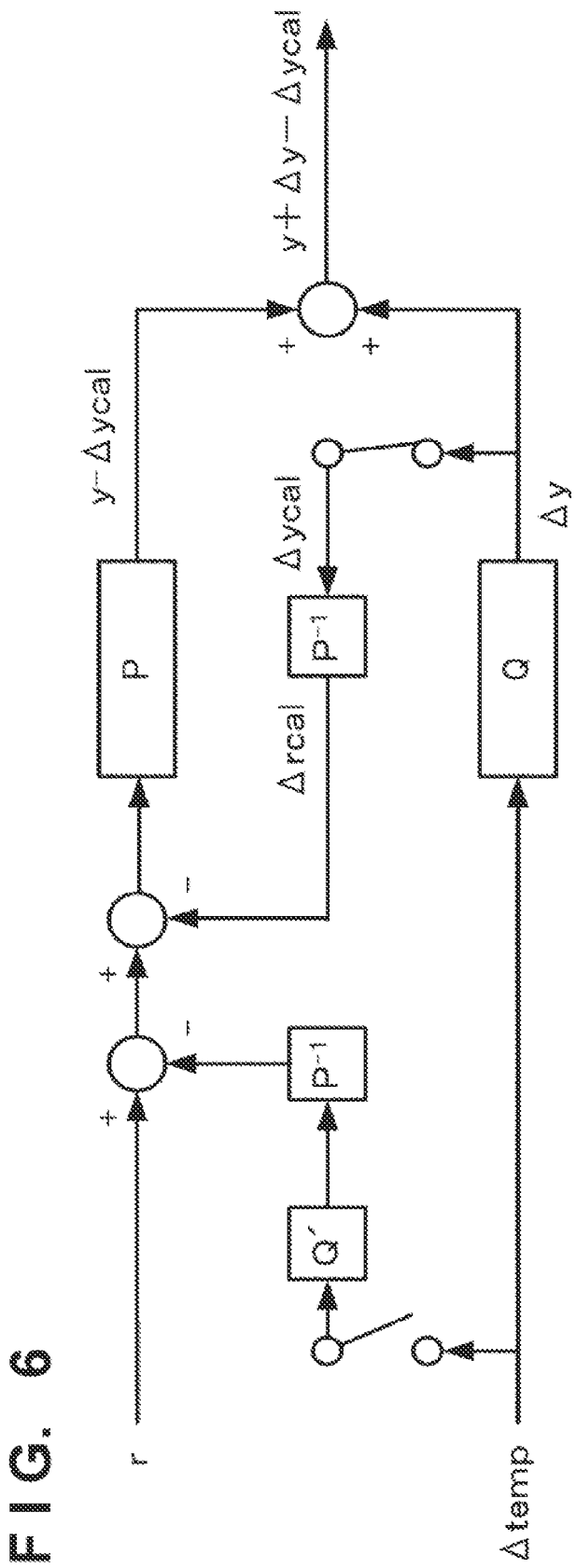
FIG. 6 is a control block diagram of calibration of the image position control at the image forming apparatus according to the first embodiment.
Figure 7:
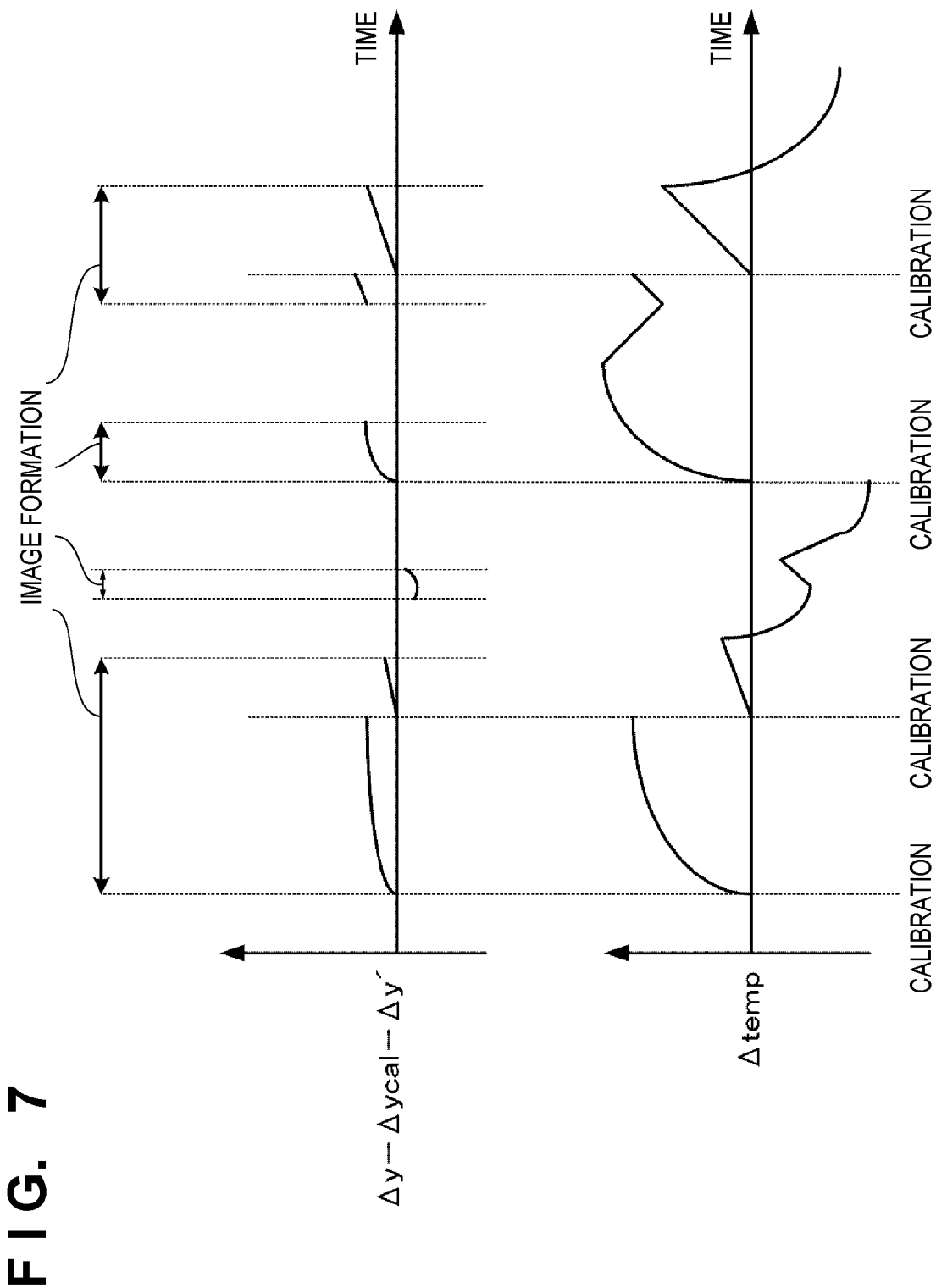
FIG. 7 is a graph showing changes of image mispositioning at the image forming apparatus according to the first embodiment.

Next, the image forming apparatus according to the present invention will be described below. In FIGS. 5 and 6, reference letter r denotes image writing timing, reference letter y denotes image position, symbol Δtemp denotes a temperature change amount, symbol Δy denotes an image mispositioning amount due to temperature change, symbol Δycal denotes an image mispositioning amount at the time of a calibration operation, symbol Δrcal denotes an image writing timing correction value calculated in the calibration operation, reference letter P denotes a transfer function representing a relationship between image writing timing r and image position y, and reference letter Q denotes a transfer function representing a relationship between temperature change Δtemp and image mispositioning amount Δy. In one example embodiment, Δtemp denotes a temperature difference between the time of a previous calibration and the time of formation of an image. Also, in FIGS. 5 and 6, symbol Δy' denotes an image mispositioning prediction value based on temperature change, symbol Δr' denotes an image writing timing correction value based on temperature change, and reference letter Q' denotes a transfer function for a prediction of image mispositioning due to temperature change. For example, reference letter Q' refers to a transfer function for calculating the image mispositioning prediction value Δy' set based on the temperature difference Δtemp. At the time of image formation, as shown in FIG. 5, image writing timing r is corrected using the timing correction value Δrcal at the time of a previous calibration and the image writing timing correction value Δr' set based on the temperature change amount Δtemp. FIG. 6 is a control block diagram of a calibration, that is, updating of the timing correction value Δrcal. As shown in FIG. 7, by making such a correction through a prediction of an image mispositioning amount based on a temperature change amount Δtemp after a previous calibration, a reduced image mispositioning amount can be achieved.

Next, an image forming system according to the present invention and its operation will be described below. To begin with, a control unit 50 in an image forming apparatus 100 of FIG. 8 determines whether a calibration is to be performed at step S1 in FIG. 9. Calibration is performed when the number of sheets printed after a previous calibration has reached a predetermined number or immediately after power-on, for example. When not performing calibration, the control unit 50 obtains temperature data from a temperature sensor 621 of FIG. 8 at step S2 with the start of an image formation operation. At step S3, the control unit 50 calculates a difference Δtemp between the obtained temperature data and a reference temperature stored in a storage unit 52. Incidentally, "reference temperature" refers to a temperature at the time of a previous calibration. Thereafter, a simulation unit 51 calculates an image mispositioning prediction value Δy' by using a previously found transfer function Q' at step S4. At step S5, the control unit 50 calculates an image writing timing correction value Δr' from the prediction value Δy', and then corrects the image writing timing r by using a correction value Δrcal stored in the storage unit 52 in addition to the correction value Δr'.

Figure 10:
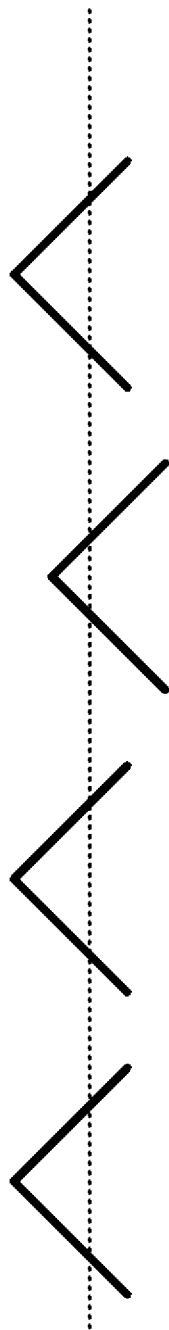
FIG. 10 is an illustration of a patch image.

When performing calibration, the control unit 50 obtains temperature data from the temperature sensor 621 at step S7. After that the control unit 50 controls the image forming unit of the image forming apparatus 100 to form a patch image at step S8. The term "patch image" refers to an image as shown in FIG. 10, for example. At step S9, a patch sensor 620 in the image forming apparatus 100 detects each patch image, and calculates the amount of mispositioning on each patch image. The amount of mispositioning on each patch image is a difference between a detected position and a reference position shown by a dotted line in FIG. 10. Incidentally, as shown in FIG. 6, the patch image is formed without using the correction value calculated by the simulation unit 51.

At step S10, the control unit 50 notifies a server 300 of the patch image mispositioning amount, the temperature data obtained at step S7, and the reference temperature via a network. Processing at the server 300 will be described later. At step S11, the control unit 50 then calculates an image writing timing correction value Δrcal from the sensed image mispositioning. And further, at step S12, the control unit 50 stores the temperature data obtained at step S7 in the storage unit 52 as the next reference temperature, together with the correction value Δrcal.

Figure 8:
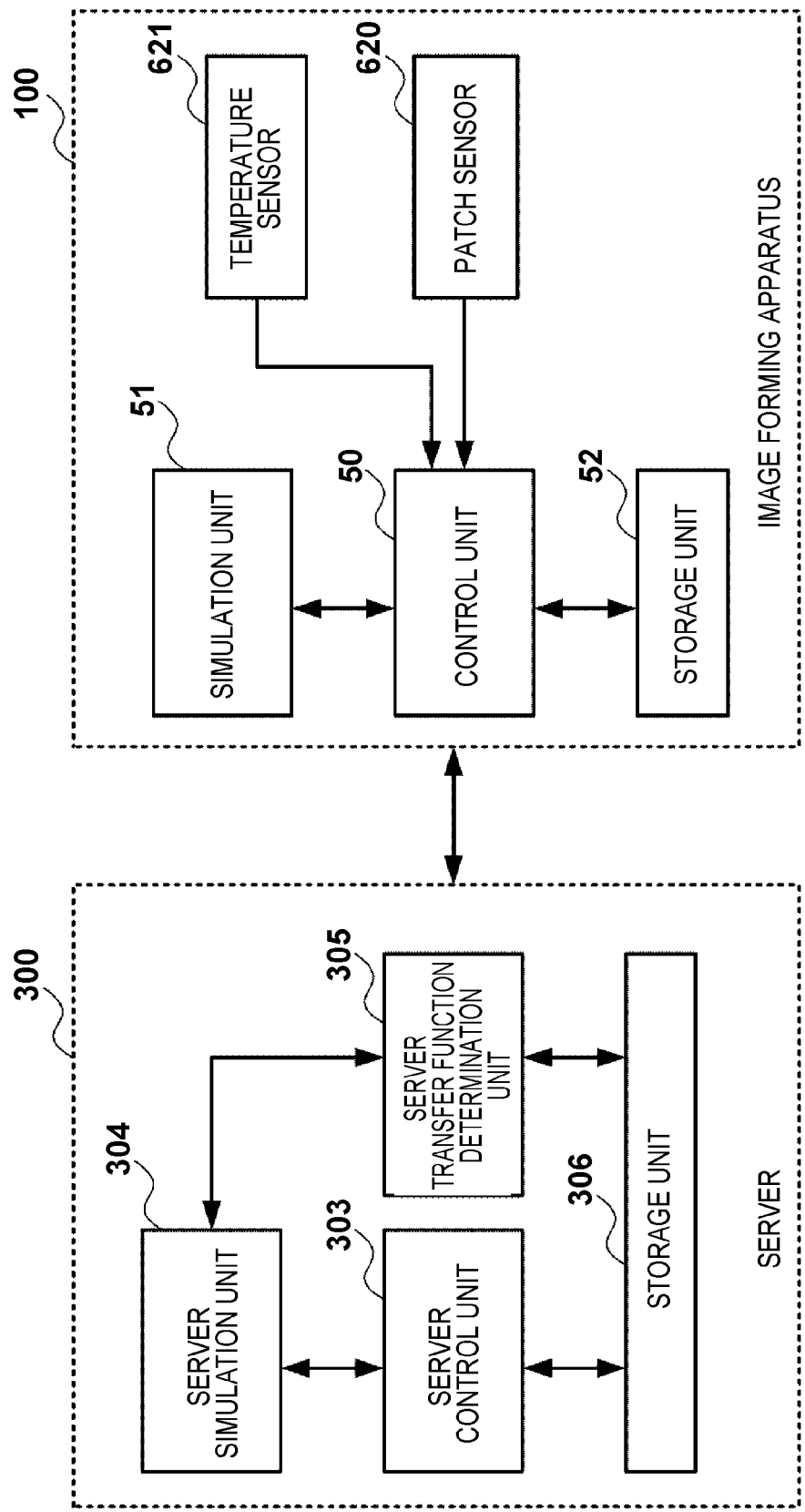
FIG. 8 is a block diagram of an image forming system according to the first embodiment.
Figure 9:
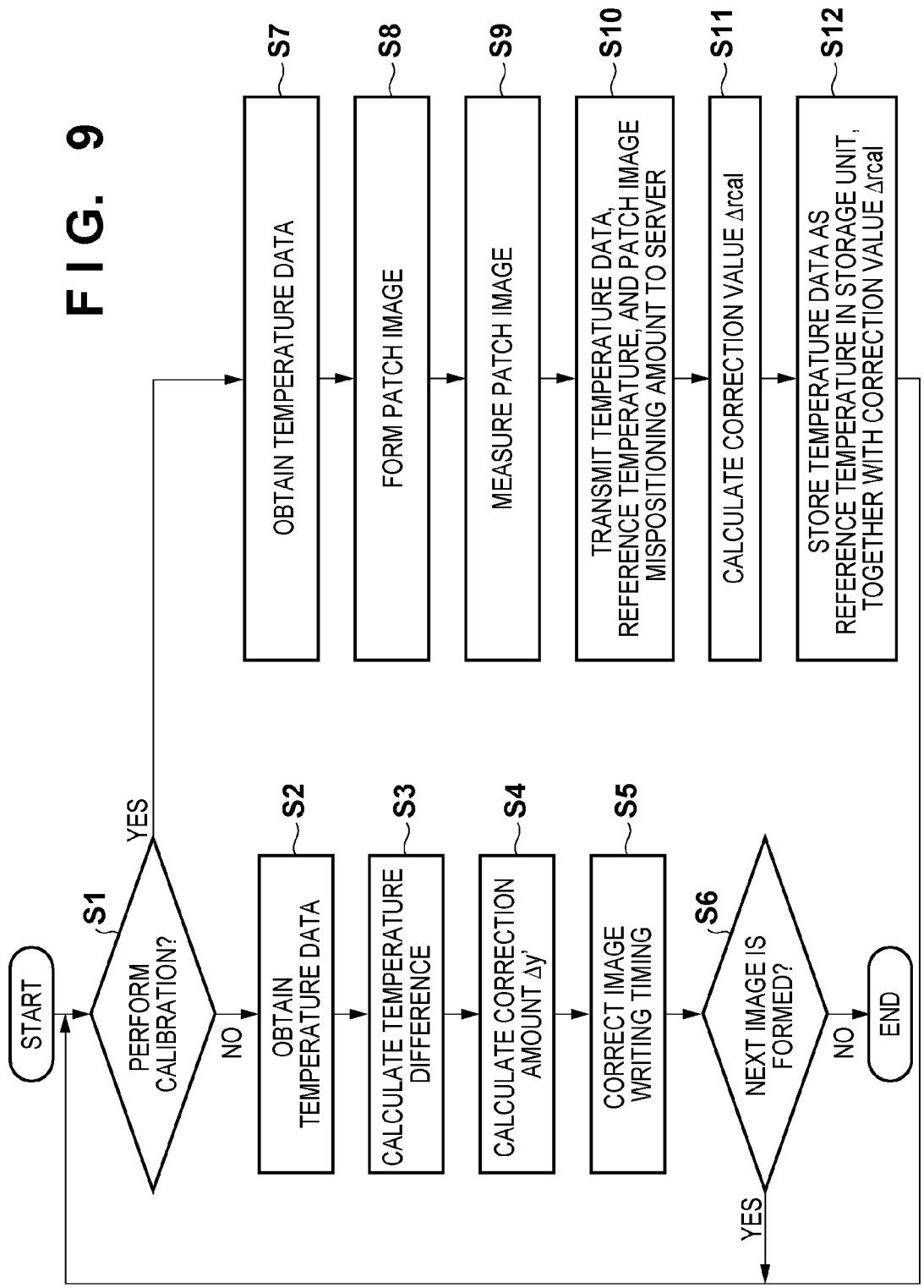
FIG. 9 is a flowchart of the image position control and the calibration.

The simulation unit 51 is a unit that calculates a prediction value Δy' of the amount of image mispositioning effected by a temperature change amount Δtemp, and the mathematical operation accuracy of the simulation unit 51 greatly affects the accuracy of an image position. Because of this, the simulation unit 51 comes to store transfer functions Q' found by simulations performed based on a mechanism analysis and on verification based on many pieces of data. However, differences between simulation results and operations of the individual image forming apparatuses 100 arise due to individual differences and so on. Also, due to deterioration with time of the image forming apparatus 100, the difference between the result of a mathematical operation by the simulation unit 51 and its actual behavior sometimes increases. Therefore the server 300 is provided on the network as shown in FIG. 8. The server 300 manages the simulation units 51 of the individual image forming apparatuses 100. Processing by the server 300 will be described below.

Figure 11:
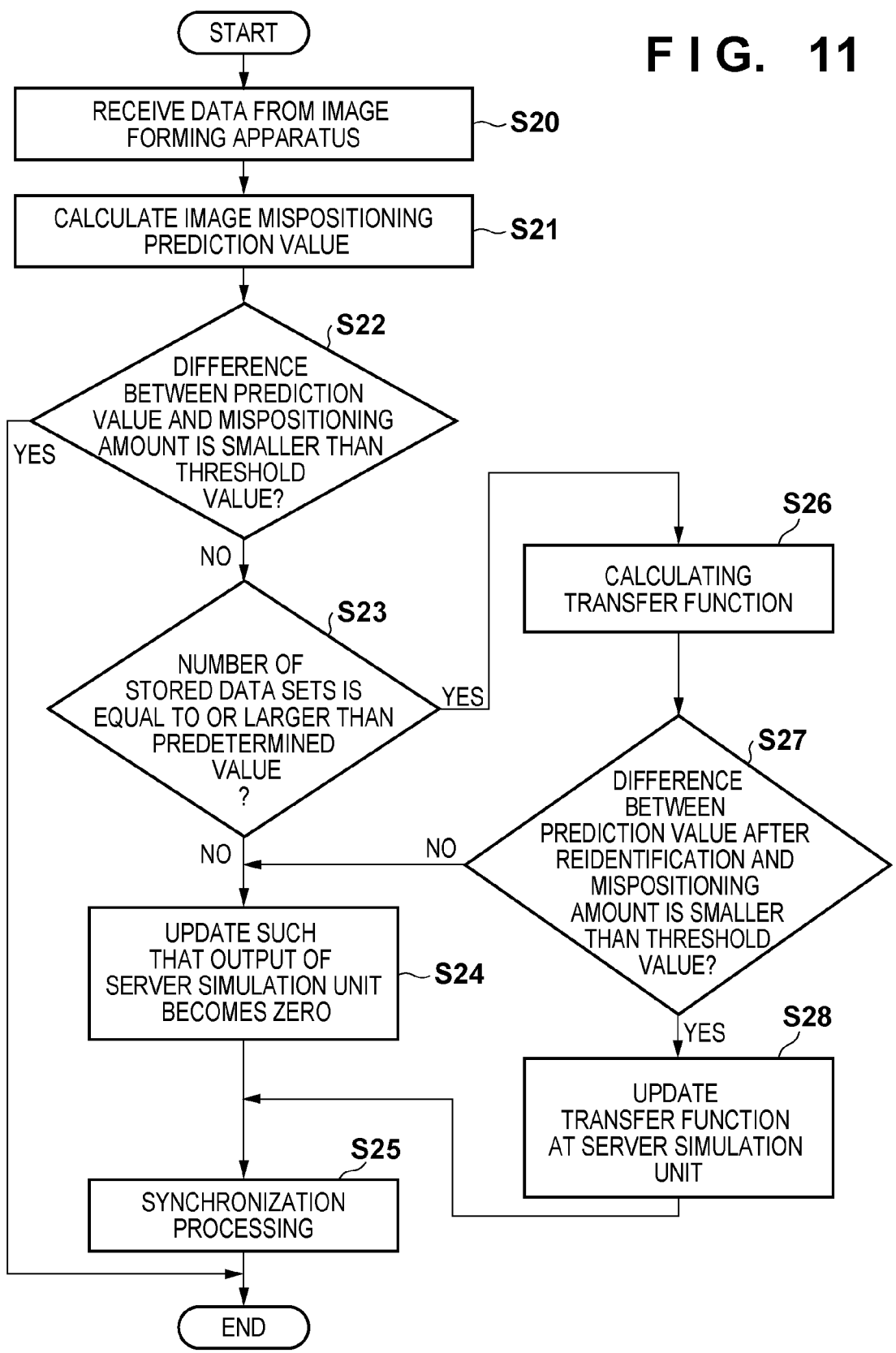
FIG. 11 is a flowchart of processing at a server according to the first embodiment.

At step S20 in FIG. 11, a server control unit 303 of FIG. 8 is notified of temperature data at the time of a calibration, a reference temperature, and an image mispositioning amount by the image forming apparatus 100, and stores them in a storage unit 306. At step S21, a server simulation unit 304 calculates an image mispositioning prediction value $\Delta y'$ by using a transfer function Q' of the simulation unit 51. At step S22, the server control unit 303 calculates the difference between the prediction value $\Delta y'$ and the image mispositioning amount received at step S20, that is, an error, and compares the error with a first threshold value. When the error is smaller than the first threshold value, the server control unit 303 determines that the mathematical operation accuracy of the simulation unit 51 is high. In contrast, when the error is equal to or larger than the first threshold value, the server control unit 303 determines whether the number of stored data sets stored in the storage unit 306 is equal to or larger than a predetermined value at step S23. In this case, a set of data refers to data including temperature data, a reference temperature, and an image mispositioning amount that is received at the time of a calibration.

When the number of the stored data sets is equal to or larger than the predetermined value, a server transfer function determination unit 305 determines a transfer function, that is, updates a transfer function at step S26. For example, it is assumed that the server simulation unit 304 has calculated a prediction value $\Delta y'$ through the use of the following transfer function (1) obtained by using the n pieces of previous data and then linear-combining the differences $\Delta temp_k$ (k's are integers from 1 to n) between the temperature data and the reference values of the individual sets through the use of coefficients $d_k$.

$$\Delta y' = d_1 \Delta temp_1 + d_2 \Delta temp_2 + \ldots + d_n \Delta temp_n \quad (1)$$

In this case, the server transfer function determination unit 305 sets the coefficients $d_1$ to $d_n$ again so that they correspond most closely to the data stored in the storage unit 306. This raises an optimization issue that the square of the difference between a prediction value $\Delta y'$ and an image mispositioning amount of actual measurement data is used as an objective function to find coefficients $d_1$ to $d_n$ that minimizes the objective function. Examples of a solution to the optimization issue include a steepest descent method, a genetic algorithm, and PSO (particle swarm optimization) implemented by modeling the behavior of organism groups; any method can be used.

The server control unit 303 determines whether the difference between the prediction value $\Delta y'$ recalculated using the updated transfer function and an actual mispositioning amount is equal to or smaller than a second threshold value at step S27. Note that it is preferable that data other than the data used for updating of the transfer function be used to make the determination. When the difference is equal to or smaller than the second threshold value, the server control unit 303 updates the transfer function of the server simulation unit 304 to a transfer function found by the server transfer function determination unit 305 at step S28. In contrast, when the number of the data sets stored in the storage 306 is smaller than the predetermined value or when the difference is larger than the second threshold value at step S27, the server control unit 303 determines a halt on the use of the simulation unit 51. Because of this, at step S24, the server control unit 303 sets a transfer function so that an output value at the server simulation unit 304 becomes zero regardless of an input value. At step S25, the server control unit 303 synchronizes the server simulation unit 304 and the simulation unit 51 of the image forming apparatus 100. That is, the image forming apparatus 100 is notified of a transfer function obtained at the server simulation unit 304, and a transfer function obtained at the simulation unit 51 is made to correspond with the transfer function obtained at the server simulation unit 304.

As described above, the image forming apparatus 100 has the simulation unit 51 and an operation unit (the image forming unit mentioned in this embodiment) that operates by using an output value from the simulation unit 51. The accuracy of the operation unit depends on the prediction accuracy of the simulation unit 51, and therefore the prediction accuracy is improved using the actual measurement data stored in itself. Thus it is also possible to deal with the deterioration with time of the image forming apparatus 100. And further, by carrying out the update of the transfer function involving a heavy data storage load and a heavy mathematical operation load at the server 300 side rich in resources, the image forming apparatus 100 having a simple structure can be implemented. Note that the server 300 may be provided to more than one image forming apparatus. That is, the server and the image forming apparatus are in a one-to-one relationship or in a one-to-plural relationship. Incidentally, in a case where the resources do not become a problem, the functions of server 300 can be implemented at the image forming apparatus 100.

Second Embodiment

Figure 12:
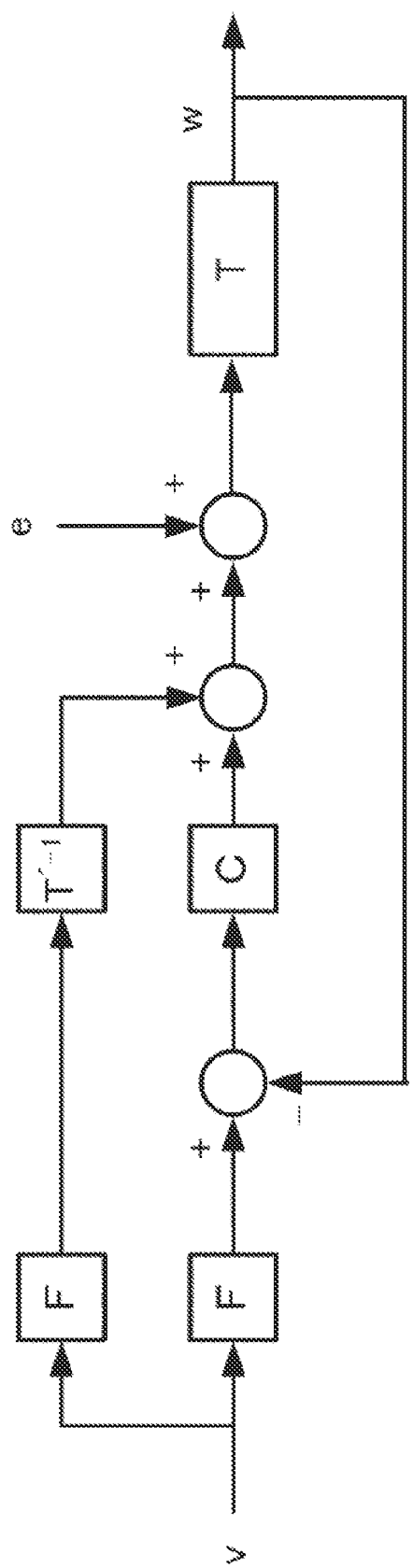
FIG. 12 is a control block diagram of drum driving according to a second embodiment.

A second embodiment of the present invention will be described below with reference to calibration of driving control of the photoconductor drum. In FIG. 12 reference letter v denotes a motor rotational speed target value, reference letter w denotes output of encoder (motor rotational speed), reference letter e denotes load disturbance, reference letter T denotes actual behavior (plant transfer function), reference letter $T^{-1}$ denotes a reciprocal of the transfer function T found by simulating actual behavior, reference letter C denotes a feedback controller, and reference letter F denotes a filter. As shown in a control block diagram of FIG. 12, drum driving control includes the feedback controller part C for dealing with disturbance e and a feed-forward part for establishing correspondence to the rotational speed target value v. "Feed-forward part" refers to a path including the reciprocal $T^{-1}$ of a transfer function found by simulating operation of the driving control part.

Figure 13:
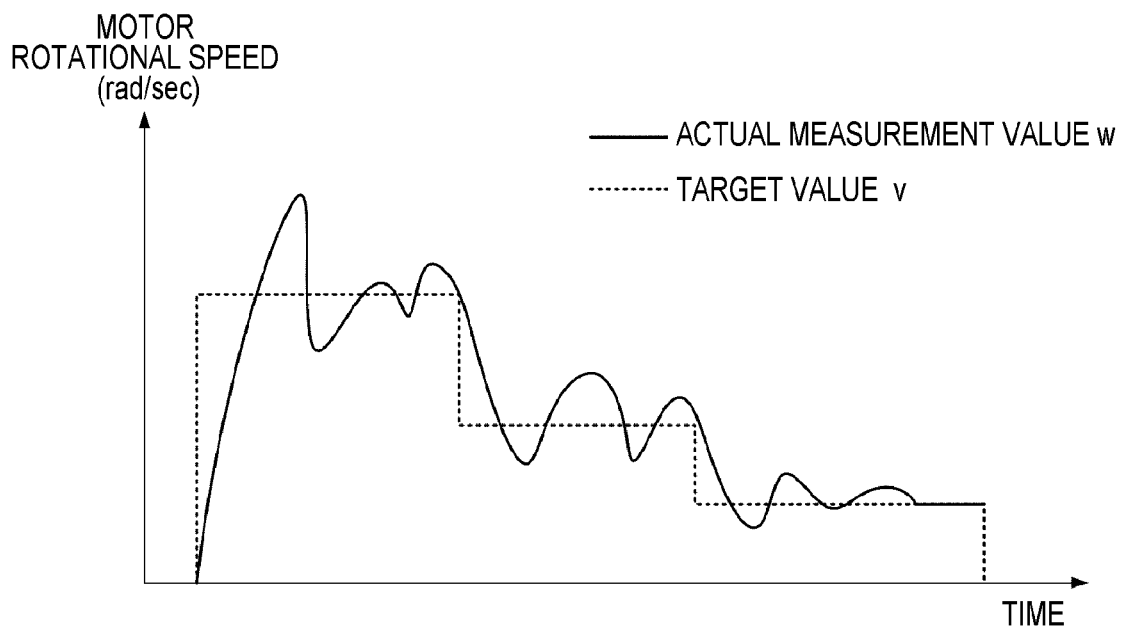
FIG. 13 is a graph showing rotational speed target values and actual rotational speeds in a case where no feed-forward part is provided.
Figure 14:
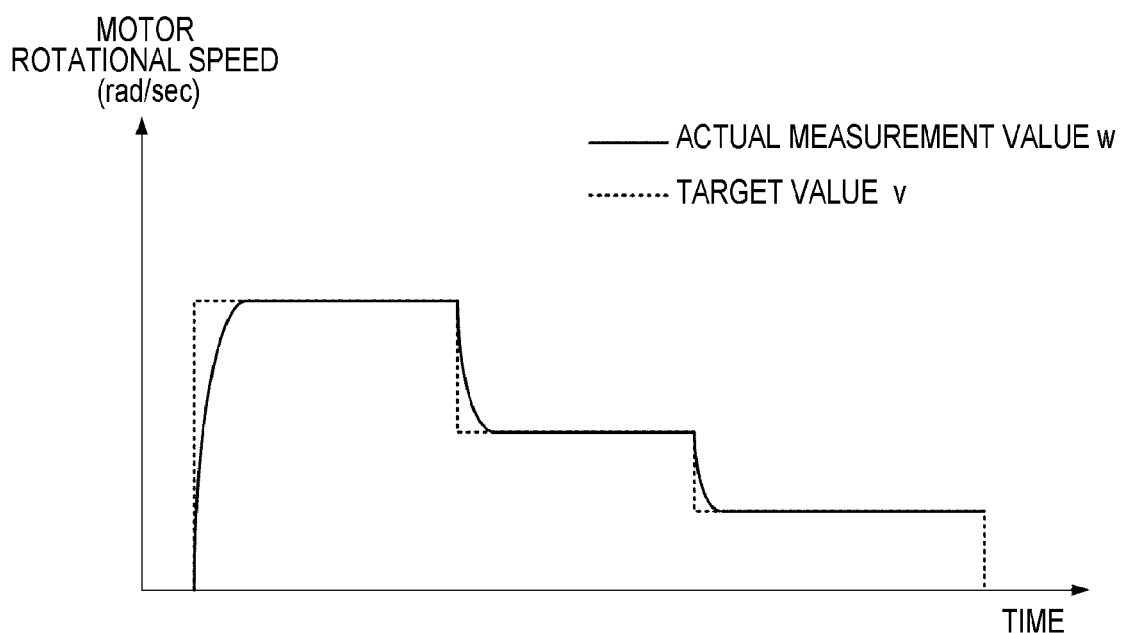
FIG. 14 is a graph showing rotational speed target values and actual rotational speeds in a case where a feed-forward part is provided.

It is difficult to achieve both correspondence to a rotational speed target value v and suppression of disturbance e. Therefore, in a case where a feed-forward part is not provided, as shown in FIG. 13, it takes time until an actual rotational speed w stabilizes after the change of a rotational speed target value v. On the other hand, in a case where the reciprocal $T^{-1}$ of a transfer function obtained by the simulation corresponds well with its actual behavior, as shown in FIG. 14, even if a rotational speed target value v is changed, an actual rotational speed w will reach the rotational speed target value v with high precision by providing a feed-forward part.

Figure 15:
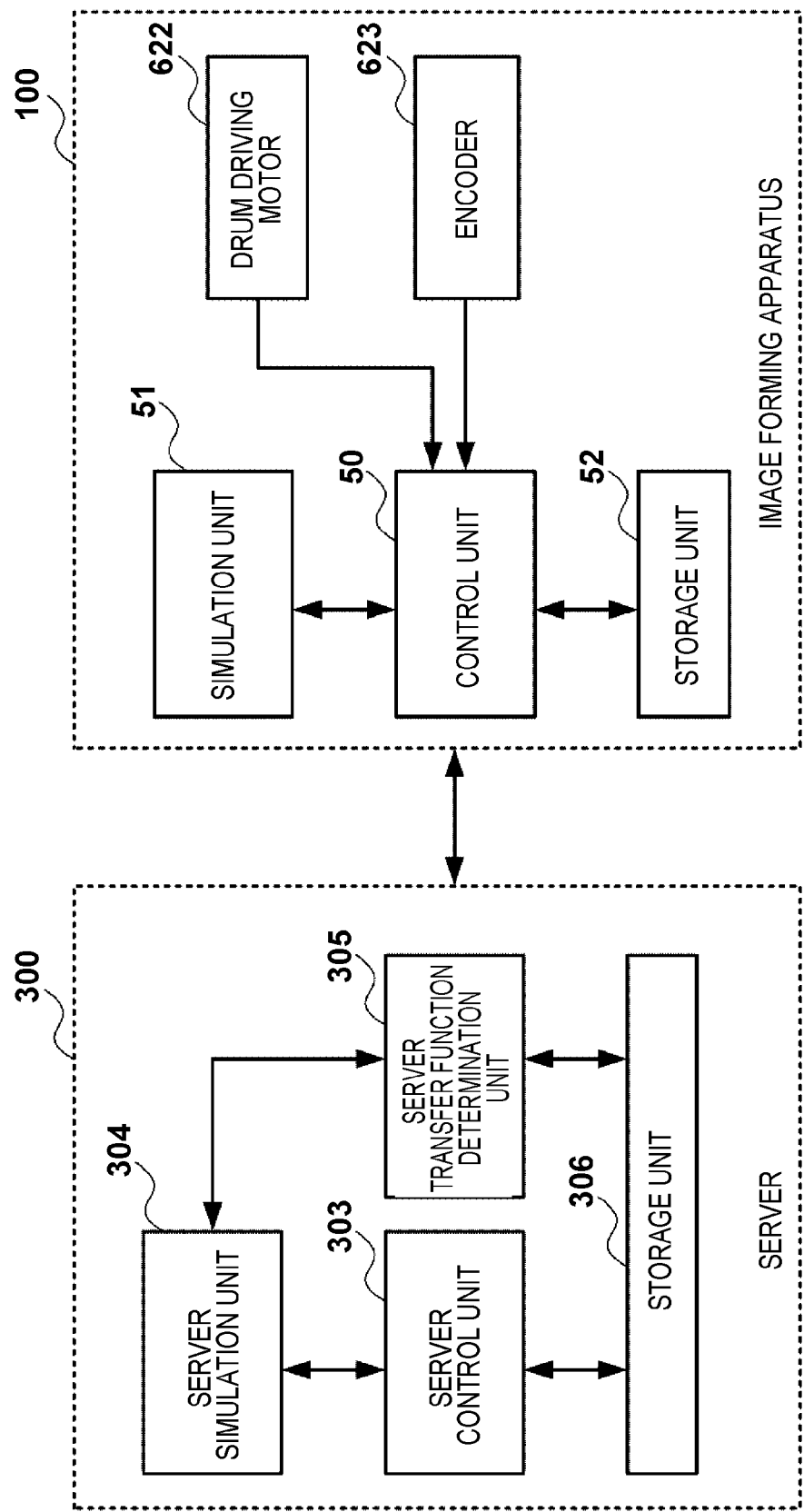
FIG. 15 is a block diagram of an image forming system according to the second embodiment.

In this embodiment, the simulation unit 51 is a unit that obtains an output value based on a rotational speed target value v input to a motor and the reciprocal $T^{-1}$ of a transfer function obtained by the simulation. And further, as shown in FIG. 15, an operation unit according to this embodiment is a driving control unit including a drum driving motor 622 for driving the photoconductor drum of the image forming apparatus 100, an encoder 623 that detects a rotational speed of the motor, etc. In this embodiment, since time history data is handled, state space displays of transfer functions can be used. To compensate for the individual differences between the image forming apparatuses 100, the server transfer function determination unit 305 updates the transfer function used at the simulation unit 51 as with the first embodiment as shown in FIG. 15. Moreover, in this embodiment, the server transfer function determination unit 305 regards the difference between a rotational speed target value v and an actual rotational speed w detected by the encoder 623 as an error to determine the coefficients of a transfer function.

Figure 16:
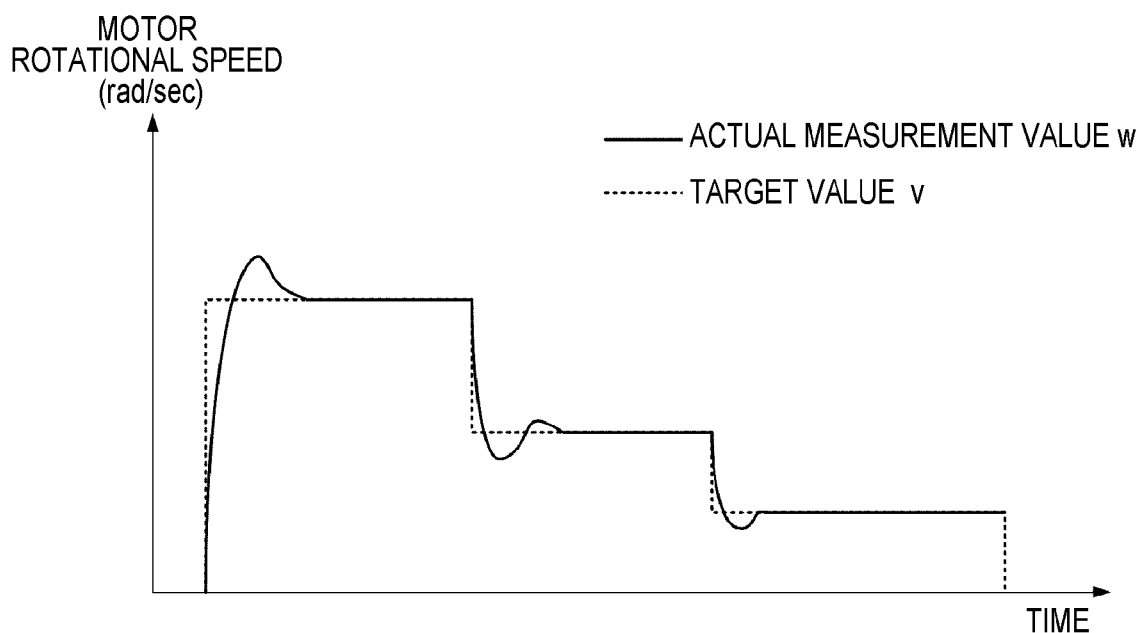
FIG. 16 is a graph showing rotational speed target values and actual rotational speeds indicated when control based on initial values has been performed.
Figure 17:
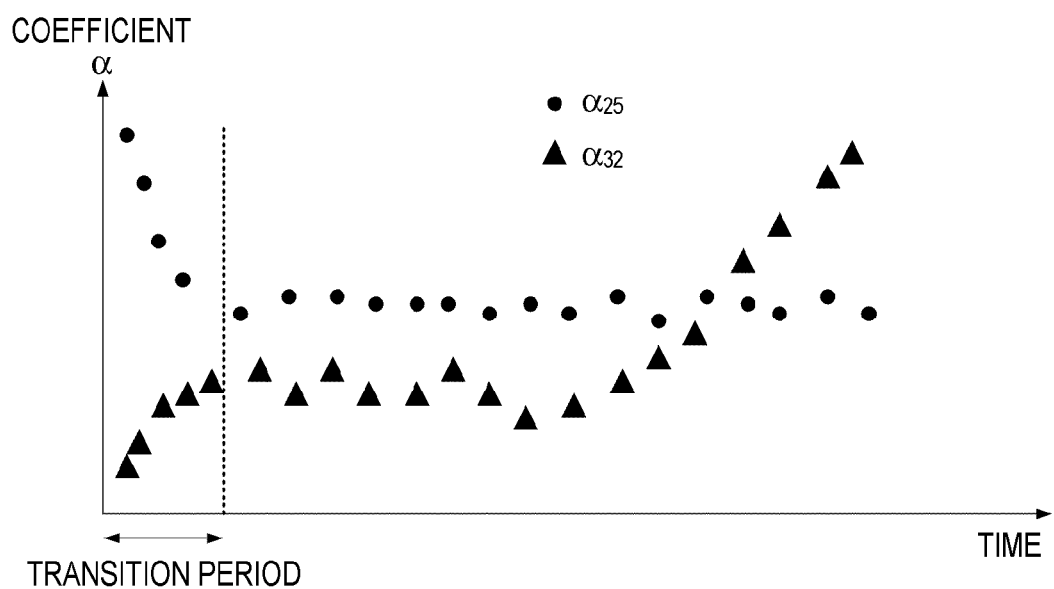
FIG. 17 is a graph showing changes with time in coefficients.

Although the coefficients used at the simulation unit 51 of each image forming apparatus 100 are factory-set at initial values, the initial values sometimes do not correspond to an optimum value for the latest lots. In that case, as shown in FIG. 16, it takes somewhat longer until rotation stabilizes in the just-shipped image forming apparatus 100. Such a state disappears by updating the transfer function at the simulation unit 51 as described in the first embodiment. Details of such processing are shown in FIG. 17. In FIG. 17, numerical reference characters $\alpha_{25}$ and $\alpha_{32}$ denote the coefficients of a transfer function used at the simulation unit 51. A transition period shown in FIG. 17 is a period required for the coefficients of a transfer function to nearly reach an optimum value; the larger the differences between the initial values at the time of their factory shipment and the optimum value are, the longer the transition period is.

That is, it is preferable that the initial values at the time of factory shipment are average values in the image forming apparatuses 100. Therefore, in this embodiment, a system management server 301 is provided that can obtain data through direct or via-network connection with each image forming apparatus 100 or the server 300 that manages each image forming apparatus 100.

Processing at the system management server 301 will be described below with reference to FIGS. 18 and 19. At step S41, a control unit 358 of the system management server 301 determines the image forming apparatuses 100 (first image forming apparatuses) in which a transfer function of the simulation unit 51 has been updated a fixed number of times or more (has reached or exceeded a third threshold value). Incidentally, the condition may be attached that the image forming apparatuses 100, which have been shipped within a predetermined time period before the determination, e.g., within one year, be determined first. At step S42, the system management server 301 obtains data stored in the storage units 306 of the servers 300 corresponding to the determined image forming apparatuses 100, and stores the data in a storage unit 352 of FIG. 18. Incidentally, the above wording "data stored in the storage units 306 of the servers 300" refers to rotational speed target values v and actual rotational speeds w in this embodiment, and refers to temperature data, reference temperatures, and image mispositioning amounts in the first embodiment. And further, the system management server 301 may directly obtain these pieces of data from the image forming apparatuses 100.

Figure 18:
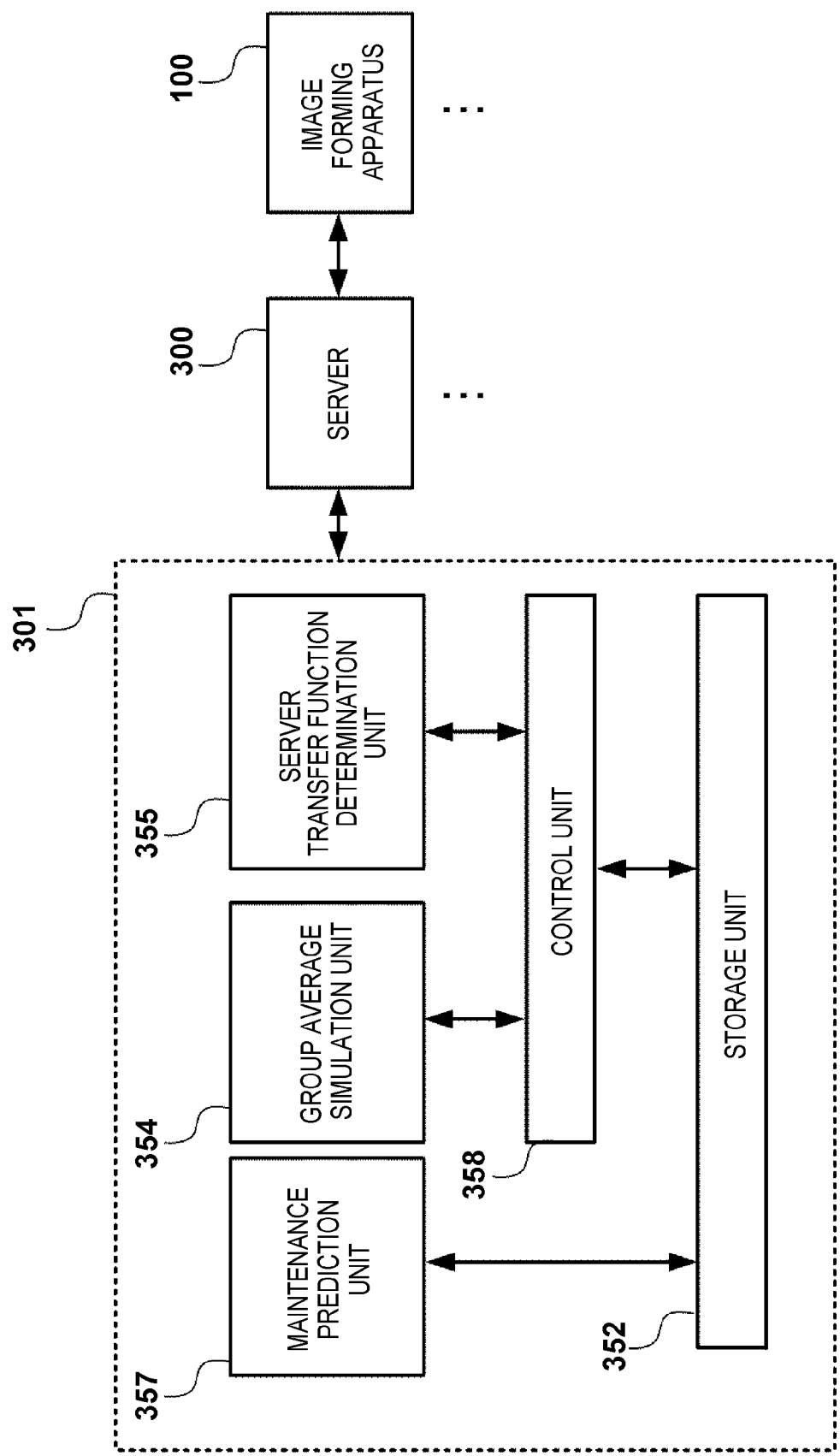
FIG. 18 is a block diagram of a system management server.
Figure 19:
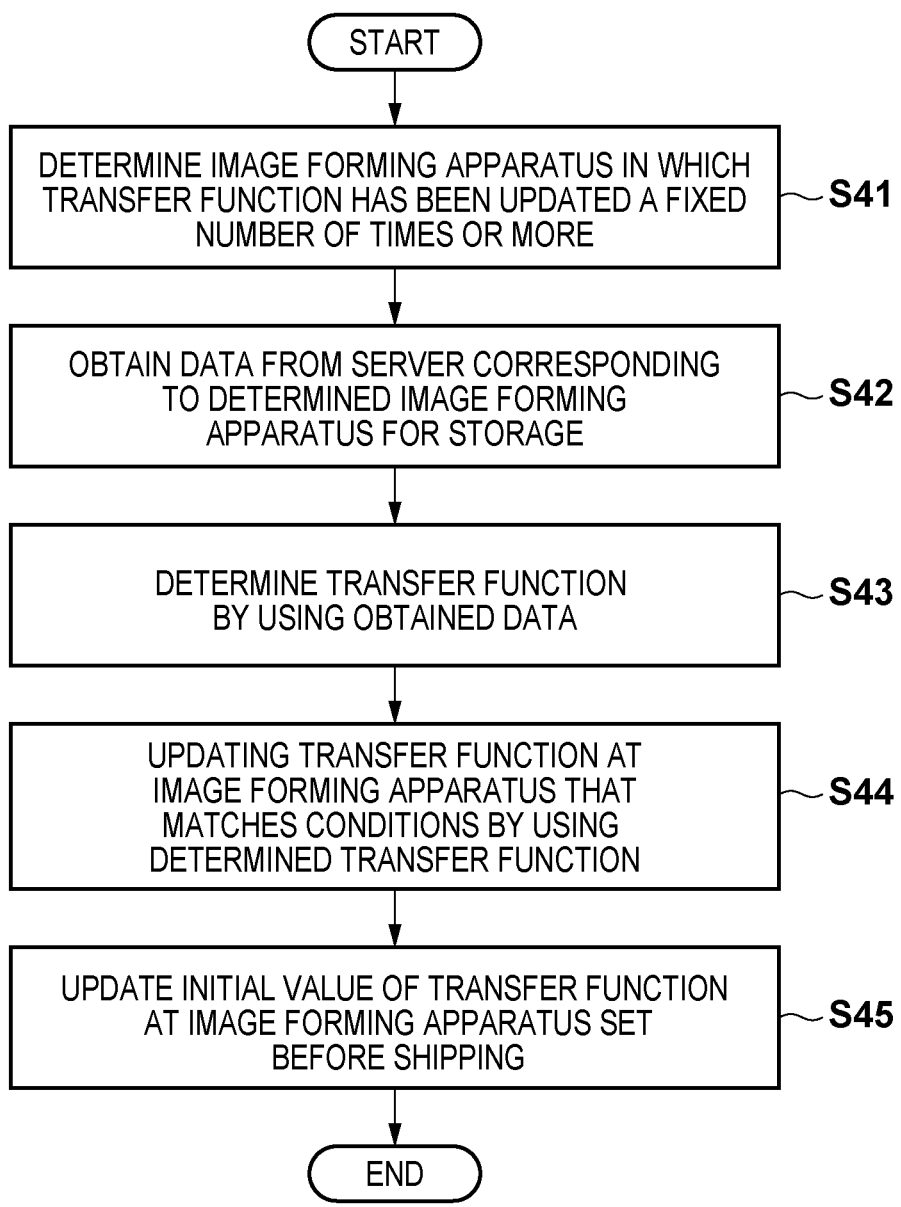
FIG. 19 is a flowchart of processing at the system management server.

At step S43, a server transfer function determination unit 355 of FIG. 18 determines the coefficients of the most preferable transfer function on the data stored in the storage unit 352 at step S42. Thereafter, the server transfer function determination unit 355 notifies a group average simulation unit 354 of the determined transfer function. Incidentally, a method for determining the coefficients at the server transfer function determination unit 355 is the same as that used at the server transfer function determination unit 305.

At step S44, the control unit 358 of the system management server 301 determines the image forming apparatuses 100 for which the period since shipment or first use is within a fixed time period (the wording "within a fixed time period" means a fourth threshold value or smaller) to begin with. Then, at step S44, among the determined image forming apparatuses 100, the control unit 358 determines the apparatus(es) 100 in which the number of the updates of the transfer function at the simulation unit 51 is smaller than a fifth threshold value (second image forming apparatus(es)). And further, at step S44, the control unit 358 updates the transfer function at the simulation unit 51 of the determined image forming apparatus(es) 100 to the transfer function at the group average simulation unit 354. At step S45, the transfer function data stored in the group average simulation unit 354 may be transmitted to a computer installed within the factory as initial values set at the simulation units 51 of image forming apparatuses that will be shipped from the factory after that.

By performing the above processing, the time taken until the coefficients converge at the simulation unit 51 can be shortened.

Figure 20:
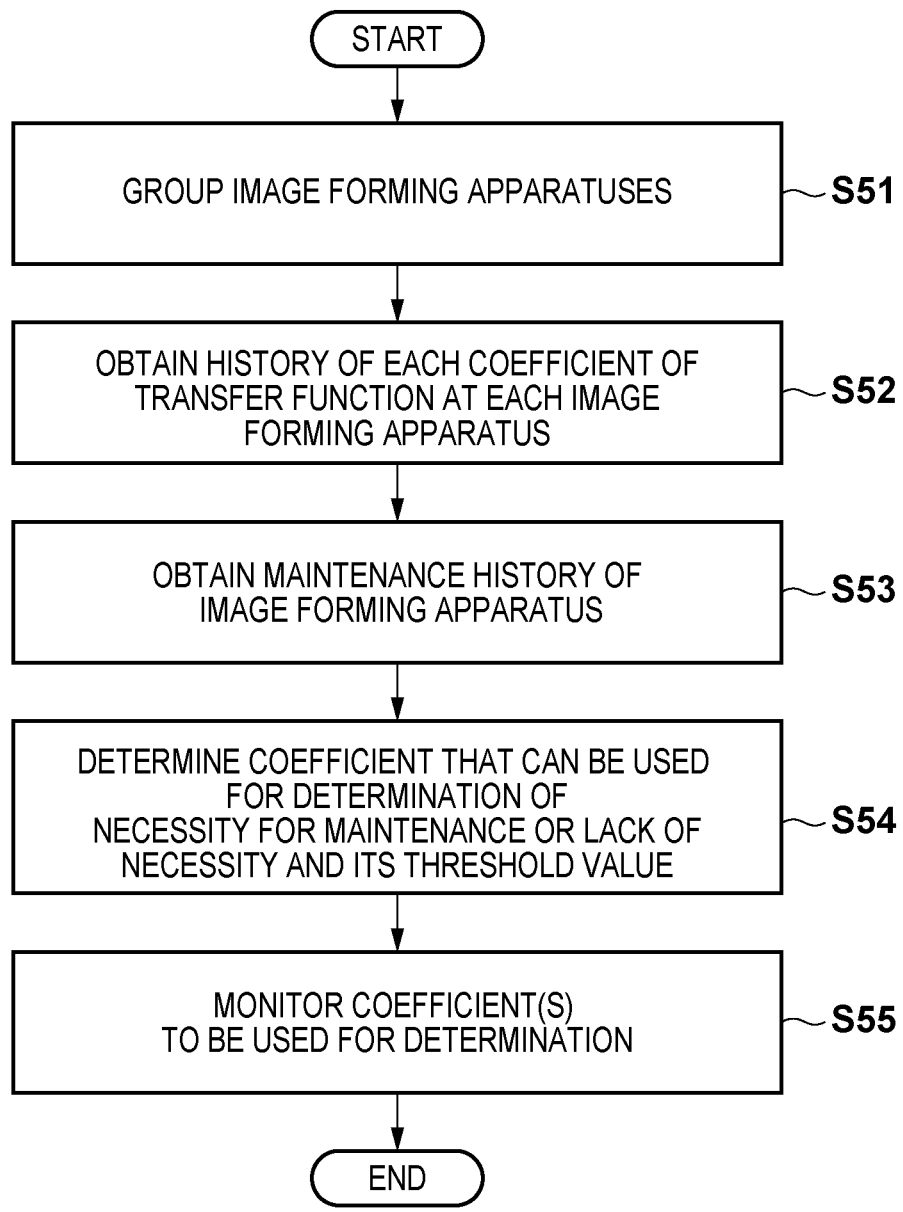
FIG. 20 is a flowchart of processing at a maintenance prediction unit.

In the following, processing at a maintenance prediction unit 357 will be described with reference to FIG. 20. At step S51, the maintenance prediction unit 357 groups the image forming apparatuses 100 into several types according to, for example, outgoing lots, predicted states of use, installation places, installation environments, and their combinations. These pieces of data to be grouped are data obtained from the image forming apparatuses 100 via the network or data directly input to the system management server 301 as data at the time of their shipment. At step S52, the maintenance prediction unit 357 obtains history data on the coefficients of the transfer functions found at the grouped image forming apparatuses 100 from the server 300 connected with the image forming apparatuses 100. Incidentally, the history data is the data that has been stored in the storage unit 306 of the server 300 by the server transfer function determination unit 305 at the time of the updating of the coefficents. And further, the history data may be directly obtained from the image forming apparatuses 100 instead of the server 300.

At step S53, the maintenance prediction unit 357 obtains the maintenance history of each image forming apparatus 100 of each group. The maintenance histories are sent from a database unit (not shown) that serves as a maintenance base to the network, and obtained by the system management server 301. Incidentally, the maintenance histories may be directly input to the system management server 301. Each maintenance history includes information on maintenance items, such as component replacement and component adjustment at the image forming apparatus 100, and dates and times when the maintenance has been done. At step S54, the maintenance prediction unit 357 finds certain maintenance item(s) from the maintenance histories and the histories of the coefficients obtained at step S52, and determines the coefficients to be used to determine the necessity for the maintenance and its threshold value (sixth threshold value).

Specifically, as for a maintenance item of the replacement of the photoconductor drum, the maintenance prediction unit 357 compares the histories of the coefficients of the transfer functions used at the time of driving control of the photoconductor drums and the replacement histories of the photoconductor drums. For example, the maintenance prediction unit 357 determines the coefficient that meets conditions that the difference in value between the coefficient immediately after the replacement and the coefficient immediately before the replacement is equal to or larger than a predetermined value and that the coefficient immediately before the replacement does not vary so much at each image forming apparatuses 100 to be the coefficient to be used for the determination of the necessity for the maintenance or the lack of the necessity. And further, the mean value, the minimum value, the maximum value, or the like of the varying values of the coefficient immediately before the replacement, for example, is determined to be its threshold value.

At step S55, the maintenance prediction unit 357 determines the necessity for the maintenance at each image forming apparatus 100 of each group or the lack of the necessity based on the threshold values determined at step S54, and then displays the image forming apparatus(es) 100 determined that the maintenance is required and the corresponding maintenance item. Incidentally, a computer installed at the corresponding maintenance base may be notified of the necessity via the network to display them at the computer itself.

Figure 21:
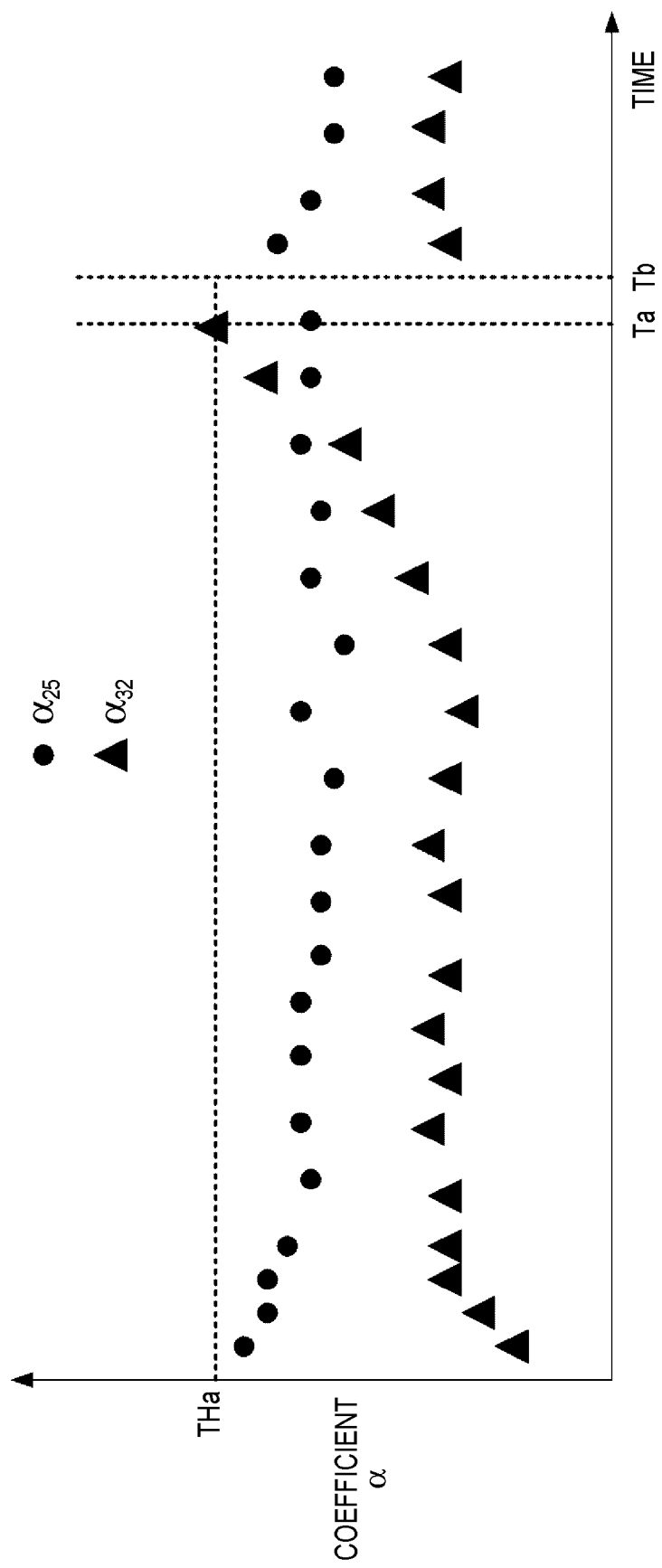
FIG. 21 is an explanatory drawing of maintenance based on maintenance prediction.

For example, assume that it has been determined at step S54 that when the coefficient $\alpha_{32}$ has exceeded a threshold value THa, the replacement of the photoconductor drum is made. In that case, as shown in FIG. 21, the maintenance prediction unit 357 displays content indicating that there is the necessity for the replacement of the photoconductor drum of the corresponding image forming apparatus 100 at a time Ta. Incidentally, FIG. 21 shows a state in which the replacement of the photoconductor drum is made at a time Tb, and the coefficient $\alpha_{32}$ decreases significantly by its updating after the replacement.

As described above, the user can be notified of suitable maintenance timing by providing the maintenance prediction unit 357. Note that as the system management server 301, an apparatus different from the server 300 or the same apparatus as the server 300 can be used. And further, the reason why the grouping is performed is that there is a possibility that the coefficients of the transfer function used for the determination of the necessity for maintenance or the lack of the necessity differ depending on the outgoing lots, predicted states of use, installation places, installation environments, etc; therefore, grouping is not necessary.

In the above embodiments, the descriptions have been made with reference to the image position control and the drum driving control; however, the present invention can also be applied to other operation units that use simulation results obtained at feed-forward parts, observer parts, etc. of control blocks such as image density stabilization control and paper feeding operation control.

As described above, according to the embodiments, improved control accuracy can be achieved at each image forming apparatus by updating a transfer function at the simulation unit 51 based on the histories of actual measurement data which the apparatus itself has obtained. And further, when the output error is equal to or larger than the first threshold value, an increase in process load at the server 300 can be suppressed by determining the coefficients of the transfer function. Furthermore, when the above error is equal to or smaller than the second threshold value, unnecessary updating of the transfer function at the simulation unit 51 can be prevented by notifying the image forming apparatus of the determined coefficients to make the simulation unit 51 update the transfer function.

Moreover, in the present invention, a system management server is provided to gather the transfer functions found at the image forming apparatuses in which it can be assumed that the transfer functions have converged at an optimum value. By updating the transfer functions at image forming apparatuses for which the period since first use is within a predetermined time period through the use of the gathered transfer functions, a time taken until the coefficients of these image forming apparatuses converge can be shortened. And further, the user can be notified of suitable maintenance timing by determining the coefficients and their values used for the determination of the necessity for maintenance or the lack of the necessity from the relationship between gathered maintenance histories and the coefficient.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-277428, filed on Dec. 13, 2010, which is hereby incorporated by reference herein in its entirety.

What is claimed is:

1. An image forming system comprising an image forming apparatus and a server, the image forming apparatus comprising:
an image forming unit including a photoconductor drum and an exposure unit and configured to form an image;
a measuring unit configured to measure a measurement image formed by the image forming unit, and to output first position information of the measurement image;
a temperature sensor configured to detect temperature in the image forming apparatus;
a calibration unit configured to determine first correction data in a calibration based on the first position information output by the measuring unit;
a determination unit configured to determine second correction data from a temperature difference between a current temperature detected by the temperature sensor and a previous temperature detected in a previous calibration by using a transfer function;
an adjustment unit configured to adjust an image forming timing of an image to be formed by the image forming unit based on the first correction data and the second correction data; and
a transmitting unit configured to transmit the first position information and a temperature detected in a current calibration to the server, in a case where the calibration unit determines the first correction data in the current calibration, and the server comprising:
a receiving unit configured to receive the first position information and the temperature from the image forming apparatus;
a storage unit configured to store the first position information and the received temperature;
a prediction unit configured to predict, based on the received temperature, second position information using the transfer function;
an update unit configured to update the transfer function based on the first position information and the received temperature stored in the storage unit; and
a control unit including a processor configured to determine whether or not to update the transfer function, and to transfer the transfer function updated by the update unit to the image forming apparatus in order to update the transfer function of the determination unit in the image forming apparatus, in a case where the control unit determines to update the transfer function.

2. The system according to claim 1, wherein one of conditions for the control unit to make the update unit update the transfer function is that a difference between the second position information predicted by the prediction unit and the first position information is equal to or larger than a threshold value.

3. The system according to claim 1, wherein the control unit is further configured to transfer the transfer function updated by the update unit to the image forming apparatus when a difference between position information predicted by the prediction unit using the updated transfer function and the first position information is equal to or smaller than a threshold value.

4. The system according to claim 1, the system further comprising a system management server, the system management server comprising:
a second control unit including a processor configured to perform control for determining a first image forming apparatus in which a number of updates of the transfer function is equal to or larger than a first threshold value and determining a second image forming apparatus in which a time period since the start of use of the second image forming apparatus is equal to or smaller than a second threshold value and in which the number of updates of the transfer function is smaller than a third threshold value; and
a second updating unit configured to update the transfer function based on the first position information and the temperature at the first image forming apparatus,
wherein the second control unit is further configured to perform control for updating the transfer function of the second image forming apparatus by using the updated transfer function updated by the second updating unit.

5. The system according to claim 4, wherein the system management server further comprises a maintenance prediction unit that obtains histories of coefficients of the transfer function of each image forming apparatus from the image forming apparatuses or the server, and then determines one or more coefficients that can be used to determine necessity for maintenance of a component of each image forming apparatus and their values based on the histories of the coefficients and maintenance histories of components of each image forming apparatus.

* * * * *